(12) United States Patent
Alleon et al.

(10) Patent No.: US 10,393,865 B2
(45) Date of Patent: Aug. 27, 2019

(54) PHASE RETRIEVAL ALGORITHM FOR GENERATION OF CONSTANT TIME ENVELOPE WITH PRESCRIBED FOURIER TRANSFORM MAGNITUDE SIGNAL

(71) Applicant: AIRBUS SAS, Blagnac (FR)

(72) Inventors: Guillaume Alleon, Coutevroult (FR); Kaushal Jadia, Bangalore (IN); Rajan Srinivasan, Bangalore (IN); Avik Santra, Hoogly (IN)

(73) Assignee: Airbus SAS, Blagnac (FR)

( * ) Notice: Subject to any disclaimer, the term of this patent is extended or adjusted under 35 U.S.C. 154(b) by 649 days.

(21) Appl. No.: 15/102,740

(22) PCT Filed: Dec. 11, 2013

(86) PCT No.: PCT/IB2013/003217
§ 371 (c)(1),
(2) Date: Jun. 8, 2016

(87) PCT Pub. No.: WO2015/087107
PCT Pub. Date: Jun. 18, 2015

(65) Prior Publication Data
US 2016/0363658 A1    Dec. 15, 2016

(51) Int. Cl.
*G01S 13/00* (2006.01)
*G01S 7/282* (2006.01)
(Continued)

(52) U.S. Cl.
CPC ............ *G01S 13/006* (2013.01); *G01S 7/282* (2013.01); *G01S 7/35* (2013.01); *G01S 13/106* (2013.01); *G01S 13/282* (2013.01)

(58) Field of Classification Search
None
See application file for complete search history.

(56) References Cited

U.S. PATENT DOCUMENTS

| 8,050,880 B2 | 11/2011 | Pillai et al. |
| 2010/0106442 A1* | 4/2010 | Pillai ................ G06F 7/544 |
| | | 702/77 |

OTHER PUBLICATIONS

International Search Report, International Application No. PCT/IB2013/003217, dated Aug. 18, 2014.
(Continued)

*Primary Examiner* — Whitney Moore
(74) *Attorney, Agent, or Firm* — Greer, Burns & Crain Ltd.

(57) ABSTRACT

The invention is an iterative process for performing iteratively the phase retrieval of an adaptive signal x(t) matching two sets of constraint both concerning the time envelope $u_e(t)$ of signal x(t) and magnitude distribution $U_m(f)$ of its spectral representation. At each iteration k the process computes an estimate $\tilde{x}_k(t)$ of signal x(t) which is obtained from a first projection $P_A$ on a first set of constraint in time domain of a computed value $x_k(t)$ of x(t), $x_k(t)$ deriving from an estimate $\tilde{X}_{k-1}(f)$ of the spectrum of signal x(t), said estimate $\tilde{X}_{k-1}(f)$ being itself obtained from a second projection $P_B$ on a second set of constraints in spectral domain of the Fourier transform $X_k(f)$ of the estimate $\tilde{x}_{k-1}(t)$ of x(t) computed at iteration k−1. Iterative computation of estimate $\tilde{x}_k(t)$ is repeated until $\tilde{x}_k(t)$ meets a predefined criterion which indicates that estimate $\tilde{x}_k(t)$ is close enough to expected signal x(t).

8 Claims, 2 Drawing Sheets

(51) Int. Cl.
  *G01S 7/35* (2006.01)
  *G01S 13/10* (2006.01)
  *G01S 13/28* (2006.01)

(56) References Cited

OTHER PUBLICATIONS

Luke, D. Russell. "Relaxed Averaged Alternating Reflections for Diffraction Imaging" Inverse Problemsl Institute of Physics Publishing, Bristol GB, vol. 21, No. 1, Feb. 1, 2005, pp. 37-50.
Bae et al. "Evaluation of Modulus-Constrained Matched Illumination Waveforms for Target Identification", IEEE Radar Conference 2010, pp. 871-876.
Levi, et al. "Image Restoration by the Method of Generalized Projections with Application to Restoration from Magnitude". Journal of the Optical Society of America A, vol. 1, No. 9, Sep. 1, 1984, p. 932.
Yang et al. "MIMO Radar Waveform Design Via Alternating Projection", IEEE Transactions on Signal Proccessing, IEEE Service Center, vol. 58, No. 3, Mar. 1, 2010, pp. 1440-1445.
Patton, et al. "Phase Retrieval for Radar Waveform Optimization" IEEE Transactions on Aerospce and Electronic Systems, IEEE Service Center, vol. 48, No. 4, Oct. 1, 2012, pp. 3287-3302.
Elser, Viet. "Phase Retrieval by Iterated Projections", Journal of the Optical Society of America A, vol. 20, No. 1, Jan. 1, 2003, p. 40.
Fienup, J.R. "Phase Retrieval Algorithms: A Comparison", Applied Optics, Optical Society of America, vol. 21, No. 15, Jan. 1, 1982, pp. 2758-2769.

\* cited by examiner

PHASE RETRIEVAL ALGORITHM FOR GENERATION OF CONSTANT TIME ENVELOPE WITH PRESCRIBED FOURIER TRANSFORM MAGNITUDE SIGNAL

CROSS REFERENCE TO RELATED APPLICATIONS

This application is the National Stage of International Application No. PCT/IB2013/003217, having an International Filing Date of 11 Dec. 2013, which designated the United States of America, and which International Application was published under PCT Article 21(2) as WO Publication No. 2015/087107 A1, the disclosure of which is incorporated herein by reference in its entirety.

BACKGROUND

1. Field

The presently disclosed embodiment relates to the general field of the generation of radio signals under constraints. It relates more particularly to the field of adaptive radar emissions

2. Brief Description of Related Developments

With the advent of adaptive synthesis of transmit waveforms in radar and sonar, the problem of reconstructing signals with constant temporal envelope with prescribed Fourier transform has become of a prime importance.

In a known manner, a radar system is considered adaptive if one or more of its transmission and/or reception parameters are altered based on the operating environment.

The adaptation of transmit waveform has sparked considerable interest in recent times owing to the considerable performance benefit it can provide.

However, for maximum efficiency, the power amplifier of the radar is usually operated at saturation, which requires a temporal signal with a constant envelope. That's why the reconstruction of a constant envelope signal from the optimized transmission waveform of adaptive radar becomes an important subject of study.

From a mathematical point of view the formulation of the technical problem of the reconstruction of a transmission signal with a time constant envelope taking into account some given spectral constraints involves determining two functions $U_m(f)$ and $u_e(t)$ that satisfy the following equation:

$$U_m(f)e^{j\theta(f)} = F\{u_e(t)e^{j\phi(t)}\} \quad [1]$$

where $F\{.\}$ denotes Fourier transform operation.

The function $u_e(t)e^{j\phi(t)}$ describes the complex modulation of the transmission signal $x(t)$, where $u_e(t)$ specifies the time-envelope of the waveform, which due to the radar system constraints must be a constant, say "A".

The Fourier transform of $u_e(t)e^{j\phi(t)}$ is denoted as $U_m(f)e^{j\theta(f)}$. Then, expressing relation [1] otherwise, $u_e(t)e^{j\phi(t)}$ can be defined by the following relation:

$$u_e(t)e^{j\phi(t)} = \int_{-\infty}^{\infty} U_m(f)e^{j(\theta(f)+2\pi ft)}df \quad [2]$$

Most of the adaptive transmit waveform solutions specify the modulus of the Fourier spectra, $U_m(f)$. The problem of finding $\theta(f)$ and/or $\phi(t)$, which meets both the desired time envelope constraint, $u_e(t)$ and the desired Fourier modulus spectra, $U_m(f)$ is called phase retrieval.

The question that arises here is to determine if it is possible to specify time envelope $u_e(t)$ and Fourier spectra $U_m(f)$ of a given signal independently, considering that the Fourier transform operation does seem to pose some constraint on the modulus of the Fourier pairs.

However, in a known manner, insofar as the time-bandwidth product of the signal becomes large, the bearing of each of the moduli of its Fourier pairs, $u_e(t)$ and $U_m(f)$, on the other one, tends to lose force.

To answer this question, several iterative known solutions have been proposed in the literature. One of the earliest is Gerchberg-Saxton algorithm (GSA), which is considered as a special case of Error Reduction Algorithm (ERA).

Based on ERA framework other general algorithms based on steepest-descent/conjugate-gradient, have also been proposed in literature.

Also, basic input-output (BIO) algorithm and Hybrid input-output (HIO) algorithms have been studied.

However, such alternating projection iterative algorithms usually suffer from slow convergence, convergence stagnation, permutation and scaling ambiguities, and sensitivity to initial seed (i.e. initial conditions).

U.S. Pat. No. 8,050,880 which is entitled "Generation of a constant envelope signal" formulates the problem of constant envelope radar signal with prescribed Fourier Transform Magnitude (FTM) in the alternating projection framework. It also outlines the fact that different starting points for the iterative algorithm gives rise to different solutions and their accuracy can be adjusted using a monotonic error criterion.

SUMMARY

One aim of the presently disclosed embodiment is to propose an iterative solution to answer this question, which does not show the aforementioned drawbacks.

To this purpose, the object of the presently disclosed embodiment is a process for performing iteratively the phase retrieval of an adaptive signal $x(t)$ matching two sets of constraint both concerning the time envelope $u_e(t)$ of signal $x(t)$ and magnitude distribution $U_m(f)$ of its spectral representation, said process computing at each iteration k an estimate $\tilde{x}_k(t)$ of signal $x(t)$. According to the presently disclosed embodiment the said estimate $\tilde{x}_k(t)$ is obtained from a first projection $P_A$ on a first set of constraint in time domain of a computed value $x_k(t)$ of $x(t)$ which derives from an estimate $\tilde{X}_{k-1}(f)$ of the spectrum of signal $x(t)$. Said estimate $\tilde{X}_{k-1}(f)$ is itself obtained from a second projection $P_B$ on a second set of constraints in spectral domain of the Fourier transform $X_k(f)$ of the estimate $\tilde{x}_{k-1}(t)$ of $x(t)$ computed at iteration k−1. Estimate $\tilde{x}_k(t)$ is a weighted sum of projection $P_A$ of $x_k(t)$ onto the first constraint domain and of $x_k(t)$ itself; and estimate $\tilde{X}_{k-1}(f)$ is a weighted sum of projection $P_B$ of $X_k(f)$ onto the second constraint domain and of $X_k(f)$ itself. The iterative computation of estimate $\tilde{x}_k(t)$ is repeated until $\tilde{x}_k(t)$ meats a predefined criterion.

According to an aspect of the presently disclosed embodiment, estimates $\tilde{x}_k(t)$ and $\tilde{X}_{k-1}(f)$ are respectively defined by the following relations:

$$\tilde{x}_k(t) = \sigma P_A\{x_k(t)\} + (1-\sigma)x_k(t), \text{ and}$$

$$\tilde{X}_k(f) = \mu P_B\{X_k(f)\} + (1-\mu)X_k(f),$$

where $\sigma$ and $\mu$ are relaxation parameter which values are less than 1 and where $P_A$ and $P_B$ are respectively defined by the following relations:

$$P_A\{x_k(t)\} = \begin{cases} Ae^{[j\phi_k(t)]} & t \in T \\ |x_k(t)|e^{[j\phi_k(t)]} & o.w. \end{cases}$$

where A is the expected constant magnitude of x(t), and $$P_B\{X_k(f)\} = \begin{cases} U_m(f)e^{\{j\theta_k(f)\}} & f\varepsilon\Omega \\ |X_k(f)|e^{\{j\theta_k(f)\}} & o.w. \end{cases}$$

where $U_m(f)$ is the expected Fourier Transform Magnitude $U_m(f)$ of signal x(t).

According to a particular aspect the values of relaxation parameters σ and μ are chosen among a set of values extending between 0.7 and 0.9.

According to another aspect of the presently disclosed embodiment, at the first iteration, the computed value $x_1(t)$ of x(t) is computed from an estimate $\tilde{X}_0(f)$ of the spectrum of x(t) defined by the following relation:

$$\tilde{X}(f) = U_m(f)e^{j\theta_0(f)}$$

where $U_m(f)$ is the expected Fourier Transform Magnitude $U_m(f)$ of signal x(t) and where $\theta_0$ is a particular initial phase defined by the following relation:

$$\theta_0(f) = -\frac{2\pi}{A^2} \int_{-\frac{\Omega}{2}}^{\frac{\Omega}{2}} \int_{-\frac{\Omega}{2}}^{f} U_m^2(\eta) d\eta df + c$$

where Ω is the spectral domain of the second constraints set.

According to another aspect of the presently disclosed embodiment, the said process comprises a test step which take place at each iteration to determine if the predefined criterion is met or not.

According to a particular aspect, the test step consists in comparing the value of the estimate $\tilde{x}_k(t)$ to the value of the previous estimate $\tilde{x}_{k-1}(t)$ to determine if the modulus $|\tilde{x}_k(t) - \tilde{x}_{k-1}(t)|^2$ is less than a determined threshold δ or not.

According to another particular aspect, the test step consists in comparing the modulus of the Fourier Transform of estimate $\tilde{x}_k(t)$ to the prescribed Fourier Transform Magnitude of the expected signal x(t), $U_m(f)$, to determine if the modulus $||F\{\tilde{x}_k(t)\}| - U_m(f)|^2$ is less than a determined threshold δ or not.

According to another particular aspect, the test step consists in comparing the number k of iterations already performed to a predefined maximum number N of iterations, to determine if k is greater than N or not.

According to another particular aspect, for the last few iterations the values of relaxation parameters σ and μ are chosen substantially equal to 1.

According to another aspect of the presently disclosed embodiment, the said process comprises at least the following steps:

A first initialisation step for inputting the data corresponding to the desired time envelope $u_e(t)$ as well as those corresponding to the spectral magnitude components Um(f) of its spectrum;

a second initialization step for consists in computing an initial seed value $\theta_0(f)$ for computing the Fourier transform of the desired signal x(t);

a third initialization step for computing a first estimate $\tilde{X}_0(f)$ of the spectral representation of the desired transmission signal x(t), $\tilde{X}_0(f)$ being defined by the following relation:

$$\tilde{X}_0(f) = U_m(f)e^{j\theta_0(f)} \forall f;$$

a fourth step for computing the current value $x_k(t)$, for an iteration k, of the desired transmission signal x(t) using an estimate value $\tilde{X}_{k-1}(f)$ of the spectral representation of x(t) obtained for the previous iteration k−1, $x_k(t)$ being defined by the following relation:

$$x_k(t) = F^{-1}\{\tilde{X}_{k-1}(f)\}$$

where F represents the Fourier transform operation;

a fifth step for performing the projection $P_1$ of the current computed value $x_k(t)$ of x(t) using projection $P_A$ of $x_k(t)$ onto a first constraint set constituted by the single value A;

a sixth step, test step, for comparing the value of $\tilde{x}_k(t)$ with these of some predefined criteria to determine when the considered criterion is matched meaning that the iterative phase of the process comprising steps four to nine (14-19) can be stopped;

a seventh step for computing the current value $x_k(f)$, for an iteration k, of the Fourier transform of the desired transmission signal x(t) using the current value $\tilde{x}_k(t)$ computed at the fourth step, $x_k(f)$ being defined by the following relation:

$$X_k(f) = F\{\tilde{x}_k(t)\}$$

where F represents the Fourier transform operation;

an eighth step for performing the projection $P_2$ of the current value $X_k(f)$ of the Fourier Transform of x(t) using projection $P_B$ of $X_k(f)$ onto a second constraint set constituted by the prescribed Fourier Transform Magnitude $U_m(f)$ of the expected signal.

a ninth step for incrementing index k indicating the number of the current iteration;

a tenth step implemented only if the sixth step is successful during which a signal $\tilde{x}_k(t)$ substantially equal to the expected signal x(t) is delivered.

The presently disclosed embodiment which proposes to use stationary phase approximation as the starting point for implementation of an alternated relaxed projections algorithm to solve a problem of phase retrieval of a signal can be used for several different applications in various fields of activity like optics, electron microscopy, radar & sonar signal processing and image processing, etc. . . . . .

DESCRIPTION OF THE DRAWINGS

The features and advantages of the presently disclosed embodiment will be better appreciated through the following description, which describes a particular implementation of the process according to the presently disclosed embodiment given as simple non limiting example and which is based on the appended figures which present.

DETAILED DESCRIPTION

As it has been stated previously, for maximum efficiency, the power amplifiers of the radar are usually operated at saturation, which requires a constant envelope time signal for the transmission signal x(t). Hence, the reconstruction of a constant envelope signal from an optimized transmission waveform for adaptive radar becomes necessary.

Thus mathematically, the problem is to find a signal x(t) such that $$|x(t)| = \begin{cases} A & \text{if } t \in T \\ 0 & o.w. \end{cases} \quad [3]$$

and for which the modulus $||F\{x(t)\}| - U_m(f)|^2$ is minimum over $f \in \Omega$ [4]

Where A is a constant quantity and $U_m(f)$ is the prescribed Fourier Transform Magnitude of the expected signal x(t), obtained from the Signal-to-Interference Ratio (SIR) or Signal-to-Noise Ratio (SNR) criteria of the adaptive waveform design.

Figure 1:
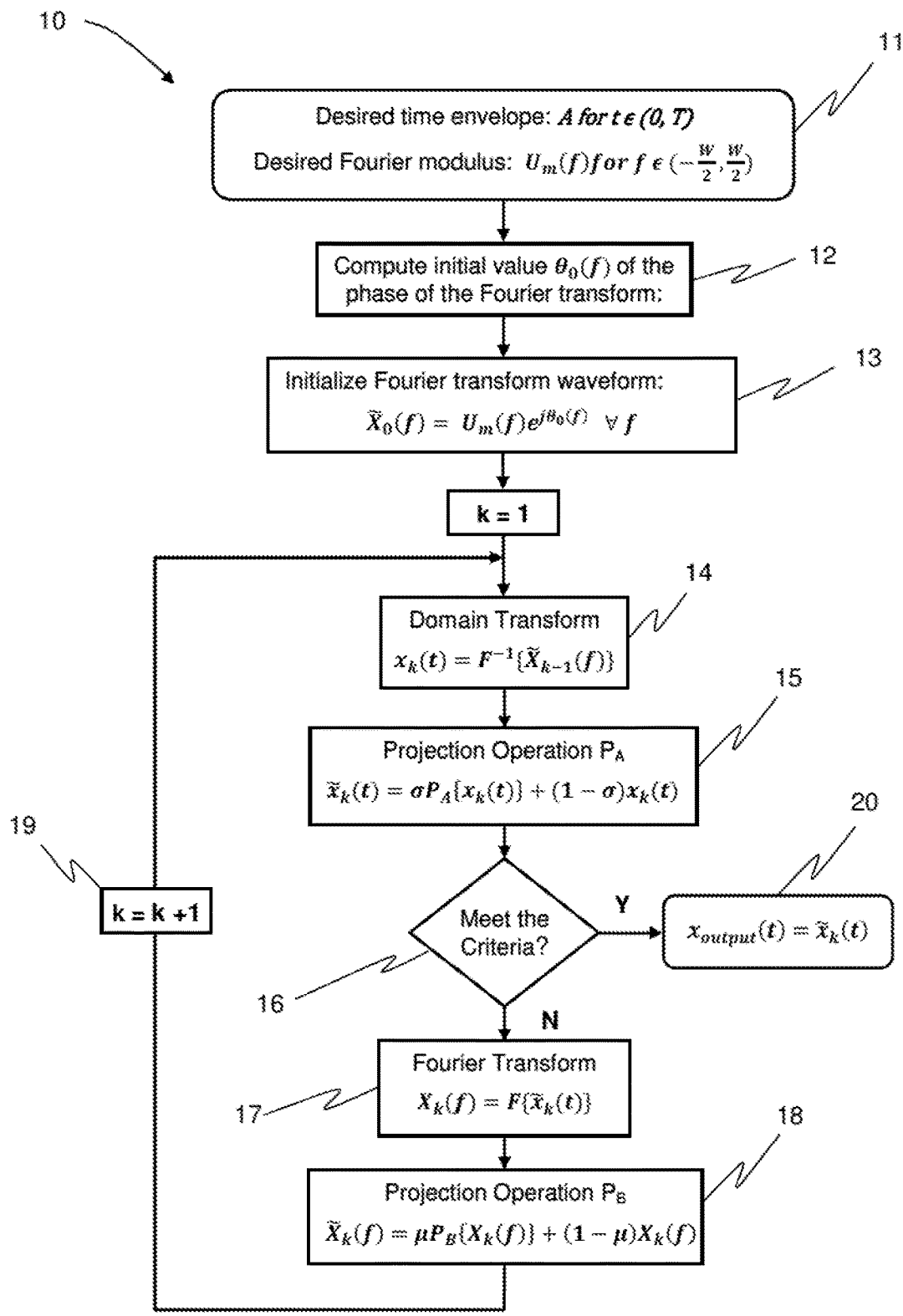
FIG. 1 is a flowchart showing the main steps of the process of the presently disclosed embodiment as implemented.

As illustrated on FIG. 1, the method according to the presently disclosed embodiment comprises several steps. The first three steps 11, 12 and 13 perform the initialization of the process while the six following steps perform the recursive processing part of the method. The final result is finally output at step 20 whereas initial commands are input at step 11.

First initialisation step 11 consists in inputting the data corresponding to the desired time envelope for the transmission signal as well as those corresponding to the spectral magnitude components of its spectrum.

These data are given for particular intervals of time ($t \in (0,T)$) and frequency ($f \in (-\Omega/2, \Omega/2)$).

Second initialization step 12 consists in computing an initial seed value $\theta_0(f)$ for computing the Fourier transform of the desired signal. The expression of $\theta_0(f)$ is determined by making the approximation that the Fourier spectrum of the input signal has a stationary phase. Approximating the Fourier spectrum as a stationary phase signal makes it possible to simplify the Fourier transform relation to one that can be de-coupled and solved as a closed-form expression.

Considering that the frequency signal to have stationary phase, for generation of non-linear frequency modulation waveforms, means considering, as it is the case here, that Derivative of the phase is close to zero only at some discrete stationary frequency points $\lambda$, and that the Fourier Transform Magnitude (FTM) varies slowly compared to the phase of the Fourier signal.

As a result of such an approximation the seed phase parameter can advantageously be expressed by the following closed form expression:

$$\theta_0(f) = -\frac{2\pi}{A^2} \int_{-\frac{\Omega}{2}}^{\frac{\Omega}{2}} \int_{-\frac{\Omega}{2}}^{f} U_m^2(\eta) \, d\eta \, df + c \quad [5]$$

where $\Omega$ represents the spectral domain of the transmission signal x(t).

It can be noted that expression [5] is same expression as that derived in for generation of Non-Linear Frequency Modulated waveforms with defined auto-correlation properties.

Third initialization step 13 consists in computing a first estimate $\tilde{X}_0(f)$ of the spectral representation of the desired transmission signal x(t). Taking relation [5] into account $\tilde{X}_0(f)$ is defined by the following relation:

$$\tilde{X}_0(f) = U_m(f) e^{j\theta_0(f)} \forall f \quad [6]$$

Step 14 is the fourth step of the process according to the presently disclosed embodiment and the first iterative step of the iterative phase which comprise steps 14 to 19. The fourth step 14 computes the current value $x_k(t)$, for an iteration k, of the desired transmission signal x(t) using an estimate value $\tilde{X}_{k-1}(f)$ of the spectral representation of x(t) obtained for the previous iteration k-1. As illustrated on FIG. 1, $x_k(t)$ is defined by the following relation:

$$x_k(t) = F^{-1}\{\tilde{X}_{k-1}(f)\} \quad [7]$$

where F represents the Fourier transform operation.

Thus, according to this step, the first computed value $x_1(t)$ of signal x(t) is given by the relation $x_1(t) = F^{-1}\{\tilde{X}_0(f)\} = F^{-1}\{U_m(f) e^{j\theta_0(f)}\}$.

Step 15 (fifth step) of the process according to the presently disclosed embodiment performs the projection $P_1$ of the current computed value $x_k(t)$ of x(t) onto a first constraint set constituted by the single value A. According to the presently disclosed embodiment projection $P_1$ is not a common direct projection, but a relaxed projection defined by the following relation:

$$\tilde{x}_k(t) = \sigma P_A\{x_k(t)\} + (1-\sigma)x_k(t) \quad [8]$$

Where $\sigma$ is a relaxation parameter chosen arbitrarily as being less than 1 and where $P_A$ is a projection defined by the following relation:

$$P_A\{x_k(t)\} = \begin{cases} A e^{\{j\phi_k(t)\}} & t \in T \\ |x_k(t)| e^{\{j\phi_k(t)\}} & o.w. \end{cases}$$

where A is the expected constant magnitude of x(t).

The result of such a projection is an estimate value for iteration k of the real value of x(t) which is a weighted sum taking into account both the result of the direct projection of the computed current value $x_k(t)$ of x(t) onto the first constraint set and $x_k(t)$.

Step 16 (the sixth step) of the process according to the presently disclosed embodiment tests the value of the estimate $\tilde{x}_k(t)$ to determine whether or not the iterative phase of the process (steps 14-19) can be stopped. According to the presently disclosed embodiment, the test consists in comparing the value of $\tilde{x}_k(t)$ with these of some criteria:

- In a first preferred aspect the value of the estimate $\tilde{x}_k(t)$ is compared to the value of the previous estimate $\tilde{x}_{k-1}(t)$ to determine if the modulus $|\tilde{x}_k(t) - \tilde{x}_{k-1}(t)|^2$ is less than a determined threshold $\delta$ or not. If it is the case then the criterion is met.
- In a second preferred aspect the modulus of the Fourier transform of the estimate $\tilde{x}_k(t)$ is compared to the prescribed Fourier Transform Magnitude of the expected signal x(t), $U_m(f)$, to determine if the modulus $||F\{\tilde{x}_k(t)\}| - U_m(f)|^2$ is less than a determined threshold $\delta$ or not. If it is the case then the criterion is met.
- In a third preferred aspect the number k of iterations already performed is compared to a determined maximum number N of iterations, to determine if k is greater than N or not. If it is the case then the criterion is met.
- In a fourth preferred aspect each of the tests of the three previous aspects are performed for each iteration k. Then, if at one of the previous tests is succeeded, then the criterion is met.

According to the presently disclosed embodiment, if the considered criterion or criteria are met at step 16, the estimate $\tilde{x}_k(t)$ is considered as matching the desired signal x(t). The iterative phase of the process then stops and the process ends with step 20 during which $\tilde{x}_k(t)$ is delivered for use. Reversely, if the considered criterion or criteria are not met at step 16, the iterative phase of the process continues with step 17.

Step 17 (seventh step) of the process according to the presently disclosed embodiment computes the current value $X_k(f)$, for an iteration k, of the Fourier transform of the desired transmission signal x(t) using the current value $\tilde{x}_k(t)$ computed at step 14. As illustrated on FIG. 1, $X_k(f)$ is defined by the following relation:

$$X_k(f) = F\{\tilde{x}_k(t)\} \quad [9]$$

where F represents the Fourier transform operation.

Step 18 (eighth step) of the process according to the presently disclosed embodiment performs the projection $P_B$ of the current value $X_k(f)$ onto a second constraint set constituted by the prescribed Fourier Transform Magnitude $U_m(f)$ of the expected signal. According to the presently disclosed embodiment projection $P_B$ is not a common direct projection, but a relaxed projection defined by the following relation:

$$\tilde{X}_k(f) = \mu P_B\{X_k(f)\} + (1-\mu)X_k(f) \quad [10]$$

Where μ is a relaxation parameter chosen arbitrarily as being less than 1.

The result of such a projection is an estimate value for iteration k of the real value of X(f) which is a weighted sum taking into account both the result of the direct projection of the current computed value $X_k(f)$ of X(f) onto the first constraint set and $X_k(f)$.

Such relaxed projections like these employed in the process according to the presently disclosed embodiment often advantageously improves the rate of convergence, and the incorporation of the non-linearity avoids solution stagnation and instances of limit cycle in several cases As illustrated on FIG. 1, the iterative phase of the process according to the presently disclosed embodiment thus comprises five computational steps 14 to 18, each iteration beginning with step 19 during which index k is incremented to K+1.

It is worth noting that μ and σ are relaxation parameters chosen arbitrarily in a set of values extending between 0 and 1 and preferably between 0.7 and 0.9. In a preferred aspect μ and σ have fixed values for all iterations. However in case that the number of iterations implemented by the process is limited to a fixed number N, the value of μ and σ parameters could be modified for the last few iterations, and fixed to a value close or even equal to 1, in order to make sure that the final computed value $x_N(t)$ of signal x(t) complies the two constraints sets.

As it is described above, the process according to the presently disclosed embodiment advantageously makes it possible to perform a signal x(t) which both responds to a constraint of time envelope and to a constraint of spectrum magnitude distribution. Such a process can be advantageously employed in many fields of activity.

It can be used in particular in adaptive radar design to construct adaptive transmission waveforms. An adaptive radar can suitably tune it's transmit waveform according to its environment and are based on optimization criteria like signal-to-noise ratio, signal-to-interference ratio, mutual information, etc. The use of the process of the presently disclosed embodiment to generate the adaptive transmit waveform advantageously improves the performance of the synthesis in terms of speed convergence increase and of decrease of the normalized mean squared error, compared to non-adaptive initial seed alternating projection methods.

Figure 2:
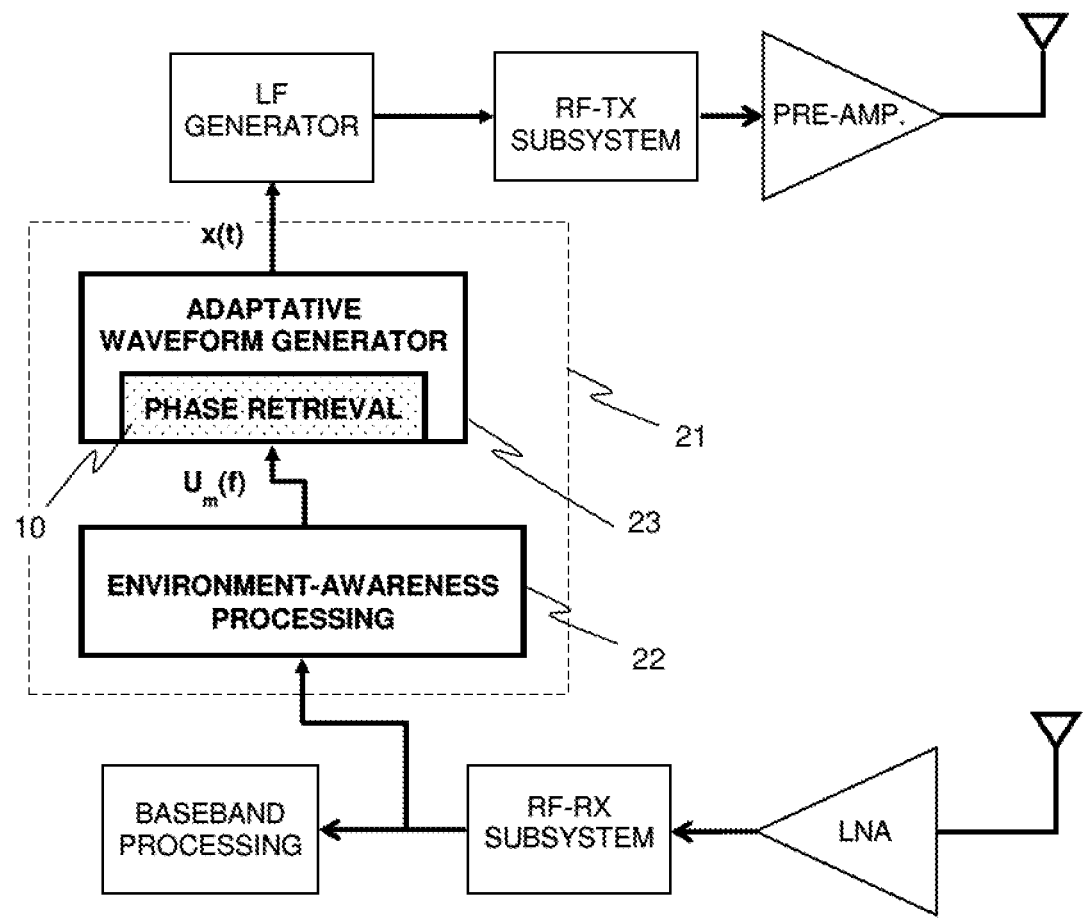
FIG. 2 is the illustration of an example of use of the process of the presently disclosed embodiment to perform an adaptive radar transmission waveform.

FIG. 2 illustrate an example of use of the process according to the presently disclosed embodiment in a signal adaptive synthesis system.

In such an application the process according to the presently disclosed embodiment takes place in the global waveform generation subsystem 21 which mainly comprises an "environment awareness" processing unit 22 and an adaptive waveform generator 23 in which the process 10 according to the presently disclosed embodiment is integrated.

The processing unit of environmental awareness 22 processes the input (after demodulation) RF signal to determine, in a known manner, the ambiance signal that accompanies useful radar signal. It outputs a constraint information $U_m(f)$ which is the distribution pattern of the magnitude (versus frequency) of the transmission signal x(t) to be synthesized. This information is taken into account by the process according to the presently disclosed embodiment which is implemented by the adaptive waveform generator 23 to perform phase retrieval of x(t) assuming that the time envelope of x(t) should be constant. Such operation leads to produce the transmission signal x(t) which is transmitted to transmission subsystem of the adaptive radar equipment.

What is claimed is:

1. A process for performing iteratively the phase retrieval of a transmission signal x(t) matching two sets of constraint both concerning the time envelope $u_e(t)$ of signal x(t) and magnitude distribution $U_m(f)$ of its spectral representation, said process computing at each iteration k an estimate $\tilde{x}(t)$ of signal x(t), comprising said estimate $\tilde{x}_k(t)$ being obtained from a first projection $P_A$ on a first set of constraint in time domain of a computed value $x_k(t)$ of x(t) which derives from an estimate $\tilde{X}_{k-1}(f)$ of the spectrum of signal x(t), said estimate $\tilde{X}_{k-1}(f)$ being itself obtained from a second projection $P_B$ on a second set of constraints in spectral domain of the Fourier transform $X_k(f)$ of the estimate $\tilde{x}_{k-1}(t)$ of x(t) computed at iteration k−1;

estimate $\tilde{x}_k(t)$ being a weighted sum of projection $P_A$ of $x_k(t)$ onto the first constraint domain and of $x_k(t)$ itself;

estimate $\tilde{X}_{k-1}(f)$ being a weighted sum of projection of $P_B$ of $X_k(f)$ onto the second constraint domain and of $X_k(f)$ itself;

iterative computation of estimate $\tilde{x}_k(t)$ is repeated until $\tilde{x}_k(t)$ meets a predefined criterion, wherein estimates $\tilde{x}_k(t)$ and $\tilde{X}_{k-1}(f)$ are respectively defined by the following relations:

$$\tilde{x}(t) = \sigma P_A\{x_k(t)\} + (1-\sigma)x_k(t), \text{and}$$

$$\tilde{X}(f) = \mu P_B\{X_k(f)\} + (1-\mu)X_k(f)$$

where σ and μ are relaxation parameter which values are less than 1 and where $P_A$ and $P_B$ are respectively defined by the following relations:

$$P_A\{x_k(t)\} = \begin{cases} Ae^{\{j\phi_k(t)\}} & t\varepsilon T \\ |x_k(t)|e^{\{j\phi_k(t)\}} & o.w. \end{cases}$$

where A is the expected constant magnitude of x(t), and $$P_B\{X_k(f)\} = \begin{cases} U_m(f)e^{\{j\theta_k(f)\}} & f\varepsilon \Omega \\ |X_k(f)|e^{\{j\theta_k(f)\}} & o.w. \end{cases}$$

where $U_m(f)$ is the expected Fourier Transform Magnitude $U_m(f)$ of signal x(t), and wherein, at the first iteration the computed value $x_1(t)$ of x(t) is computed from an estimate $\tilde{X}_0(f)$ of the spectrum of x(t) defined by the following relation:

$$\tilde{X}_0(f) = U_m(f) e^{i\theta_0(f)}$$

where Um(f) is the expected Fourier Transform Magnitude $U_m(f)$ of signal x(t) and where $\theta_0$ is a particular initial phase defined by the following relation:

$$\theta_0(f) = -\frac{2\pi}{A^2} \int_{-\frac{\Omega}{2}}^{\frac{\Omega}{2}} \int_{-\frac{\Omega}{2}}^{f} U_m^2(\eta) \, d\eta \, df + c$$

where $\Omega$ is the spectral domain of the second constraints set.

2. The process of claim 1, wherein the values of relaxation parameters σ and μ are chosen among a set of values extending between 0.7 and 0.9.

3. The process according to claim 1, wherein a test step takes place at each iteration to determine if the predefined criterion is met or not.

4. The process of claim 3, wherein the test step consists in comparing the value of the estimate $\tilde{x}_k(t)$ to the value of the previous estimate $\tilde{x}_{k-1}(t)$ to determine if the modulus $|\tilde{x}_k(t) - \tilde{x}_{k-1}(t)|^2$ is less than a determined threshold δ or not.

5. The process of claim 3, wherein the test step consists in comparing the modulus of the Fourier Transform of estimate $\tilde{x}_k(t)$ to the prescribed Fourier Transform Magnitude of the expected signal x(t), $U_m(f)$, to determine if the modulus $\||F\{\tilde{x}_k(t)\}| - U_m(f)\|_2$ is less than a determined threshold δ or not.

6. The process of claim 3, wherein the test step consists in comparing the number k of iterations already performed to a predefined maximum number N of iterations, to determine if k is greater than N or not.

7. The process of claim 6, wherein, for the last few iterations the values of relaxation parameters σ and μ are chosen substantially equal to 1.

8. The process according to claim 1, comprising at least the following steps:
- a first initialization step for inputting the data corresponding to the desired time envelope $u_e(t)$ as well as those corresponding to the spectral magnitude components $U_m(f)$ of its spectrum;
- a second initialization step for consists in computing an initial seed value $\theta_0(f)$ for computing the Fourier transform of the desired signal x(t);
- a third initialization step for computing a first estimate $\tilde{X}_0(f)$ of the spectral representation of the desired transmission signal x(t), $\tilde{X}_0(f)$ being defined by the following relation:

$$\tilde{X}_0(f) = U_m(f) e^{i\,\theta_0(f)} \forall f;$$

- a fourth step for computing the current value $x_k(t)$, for an iteration k, of the desired transmission signal x(t) using an estimate value $\tilde{X}_{k-1}(t)$ of the spectral representation of x(t) obtained for the previous iteration k−1, $x_k(t)$ being defined by the following relation:

$$x_k(t) = F^{-1}\{\tilde{X}_{k-1}(f)\}$$

where F represents the Fourier transform operation;
- a fifth step for performing the projection $P_1$ of the current computed value $x_k(t)$ of x(t) using projection $P_A$ of $x_k(t)$ onto a first constraint set constituted by the single value A;
- a sixth step, test step, for comparing the value of $\tilde{x}_k(t)$ with these of some predefined criteria to determine when the considered criterion is matched meaning that the iterative phase of the process comprising steps four to nine can be stopped;
- a seventh step for computing the current value $X_k(f)$, for an iteration k, of the Fourier transform of the desired transmission signal x(t) using the current value $\tilde{x}_k(t)$ computed at the fourth step, $X_k(f)$ being defined by the following relation:

$$X_k(f) = F\{\tilde{x}_k(t)\}$$

where F represents the Fourier transform operation;
- an eighth step performing the projection $P_2$ of the current value $X_k(f)$ of the Fourier Transform of x(t) using projection $P_B$ of $X_k(f)$ onto a second constraint set constituted by the prescribed Fourier Transform Magnitude $U_m(f)$ of the expected signal;
- a ninth step for incrementing index k indicating the number of the current iteration;
- a tenth step implemented only if the sixth step (16) is successful during which a signal $\tilde{x}_k(t)$ substantially equal to the expected signal x(t) is delivered.

* * * * *